US007373175B2

(12) United States Patent
Carter et al.

(10) Patent No.: US 7,373,175 B2
(45) Date of Patent: May 13, 2008

(54) METHOD AND APPARATUS FOR TIMEBASE SYNCHRONIZATION FOR USE WITH CELLULAR BASE STATIONS

(75) Inventors: Stephen S. Carter, Rancho Santa Fe, CA (US); Paul K. Johnson, Escondido, CA (US)

(73) Assignee: QUALCOMM Incorporated, San Diego, CA (US)

(*) Notice: Subject to any disclaimer, the term of this patent is extended or adjusted under 35 U.S.C. 154(b) by 1042 days.

(21) Appl. No.: 10/096,142

(22) Filed: Mar. 8, 2002

(65) Prior Publication Data

US 2002/0167934 A1 Nov. 14, 2002

Related U.S. Application Data

(60) Provisional application No. 60/274,850, filed on Mar. 9, 2001.

(51) Int. Cl.
*H04Q 7/30* (2006.01)
(52) U.S. Cl. ...................... 455/561; 455/502
(58) Field of Classification Search ............... 455/561, 455/560, 502, 503, 456.1–456.6; 342/357.1, 342/357.09, 357.15; 370/350; 375/356
See application file for complete search history.

(56) References Cited

U.S. PATENT DOCUMENTS 6,070,078 A * 5/2000 Camp et al. ............. 455/456.2
6,131,067 A 10/2000 Girerd ........................ 701/213
6,480,483 B2 * 11/2002 Yahata et al. ................ 370/350
6,621,813 B2 * 9/2003 Petch et al. .................. 370/350
6,677,894 B2 * 1/2004 Sheynblat et al. ........ 342/357.1
2002/0037732 A1 * 3/2002 Gous et al. .................. 455/502

* cited by examiner

*Primary Examiner*—Philip J. Sobutka
(74) *Attorney, Agent, or Firm*—Linda G. Gunderson; Richard A. Bachand; Thomas R. Rouse

(57) ABSTRACT

A server-assisted approach for synchronizing timebases (120 and 140) in a client-server system utilizes global positioning system (GPS) receivers (136 and 110) at both the client and server. In a typical implementation, the GPS receiver (136) associated with the client system receives fragmentary or incomplete data from satellites that are part of the GPS. Thus, the client GPS receiver (136) is capable of receiving only fragmentary information and cannot derive accurate time signals therefrom. The server system (102) is associated with a GPS receiver (110) capable of generating accurate time and position data based on signals from GPS satellites (114). The fragmentary information from the client GPS receiver (136) is transmitted to the server (126) along with time information indicating the time at which the client captured the fragmentary GPS data. The server (126) analyzes the fragmentary GPS data with respect to the complete GPS data available from the GPS receiver (110) associated with the server. The server (126) accurately determines the actual time at which the fragmentary GPS data was captured and transmits timing signals to the client (146). The timing signals are used to correct the client timebase (140) thus synchronizing the client and server timebases (140 and 120).

24 Claims, 3 Drawing Sheets

METHOD AND APPARATUS FOR TIMEBASE SYNCHRONIZATION FOR USE WITH CELLULAR BASE STATIONS

This application claims priority to pending Provisional application No. 60/274,850, filed on Mar. 9, 2001, incorporated herein by reference.

FIELD OF THE INVENTION

The present invention relates generally to wireless communication and, more particularly, to a method and system for timebase synchronization using wireless communication technology.

BACKGROUND OF THE INVENTION

Many communication systems, such as wireless communication systems, require an accurate timebase for satisfactory operation. For example, a code division multiple access (CDMA) wireless communication system comprises a plurality of base stations, each of which is typically positioned in a fixed location and requires an accurate timebase for satisfactory operation. The operation of a CDMA system and the requirement for an accurate timebase are known in the art and need not be described in greater detail herein.

It is known to use a global positioning system (GPS) array of satellites to provide an accurate timebase for such communication systems. Each base station is equipped with a sophisticated GPS antenna and receiver (not shown) to communicate with multiple satellites of the GPS. Based on synchronized communication with a number of satellites of the GPS, the GPS receiver provides the base station with a highly accurate timebase that may be used in subsequent communications between the base station and other base stations and between the base station and one or more mobile units.

The aforementioned GPS requires a sophisticated receiver and antenna system to assure adequate communications with multiple satellites. In an ideal implementation, the GPS antenna is mounted in a location that is free from obstructions, such as natural terrain (e.g., mountains) or man-made structures (e.g., buildings). If the base station is located in an area where communication links with the satellites are disrupted by terrain or man-made structures, it may not be possible to provide the base station with an accurate timebase. Therefore, it can be appreciated that there is a significant need for a technique to provide accurate timebase in circumstances where the GPS cannot be used to provide the desired degree of accuracy. The present invention provides this, and other advantages, as will be apparent from the following detailed description and accompanying figures.

SUMMARY OF THE INVENTION

The present invention is embodied in a system and method for synchronizing a timebase. In one embodiment, the inventive system comprises a first timing circuit to maintain time and a first global positioning system (GPS) receiver to capture at least partial location data. The system further includes a client processor to provide the partial location data and a capture time at which the partial location data was captured. A server processor is communicatively coupled to the client processor and receives the partial location data and capture time therefrom. A second GPS receiver associated with the server processor provides complete location data to the server processor. The server processor processes the complete location data and partial location data to determine therefrom an accurate time at which the partial location data was captured. The server processor provides to the client processor time data related to the accurate time at which the partial location data was captured.

In one embodiment, the time data transmitted from the server processor to the client processor is the accurate time at which the partial location data was captured. Alternatively, the server processor may transmit a time error indicating a difference between the capture time and the accurate time at which the partial location data was captured.

The system may further include a computer network coupled to the client processor and the server processor wherein communication between the client processor and server processor uses the computer network. In one embodiment, the computer network may be the Internet.

The system may further include first and second transceivers associated with the client and server processors respectively wherein communication between the client processor and the server processor uses a wireless communication link between the first and second transceivers.

DETAILED DESCRIPTION OF THE PREFERRED EMBODIMENTS

Figure 1:
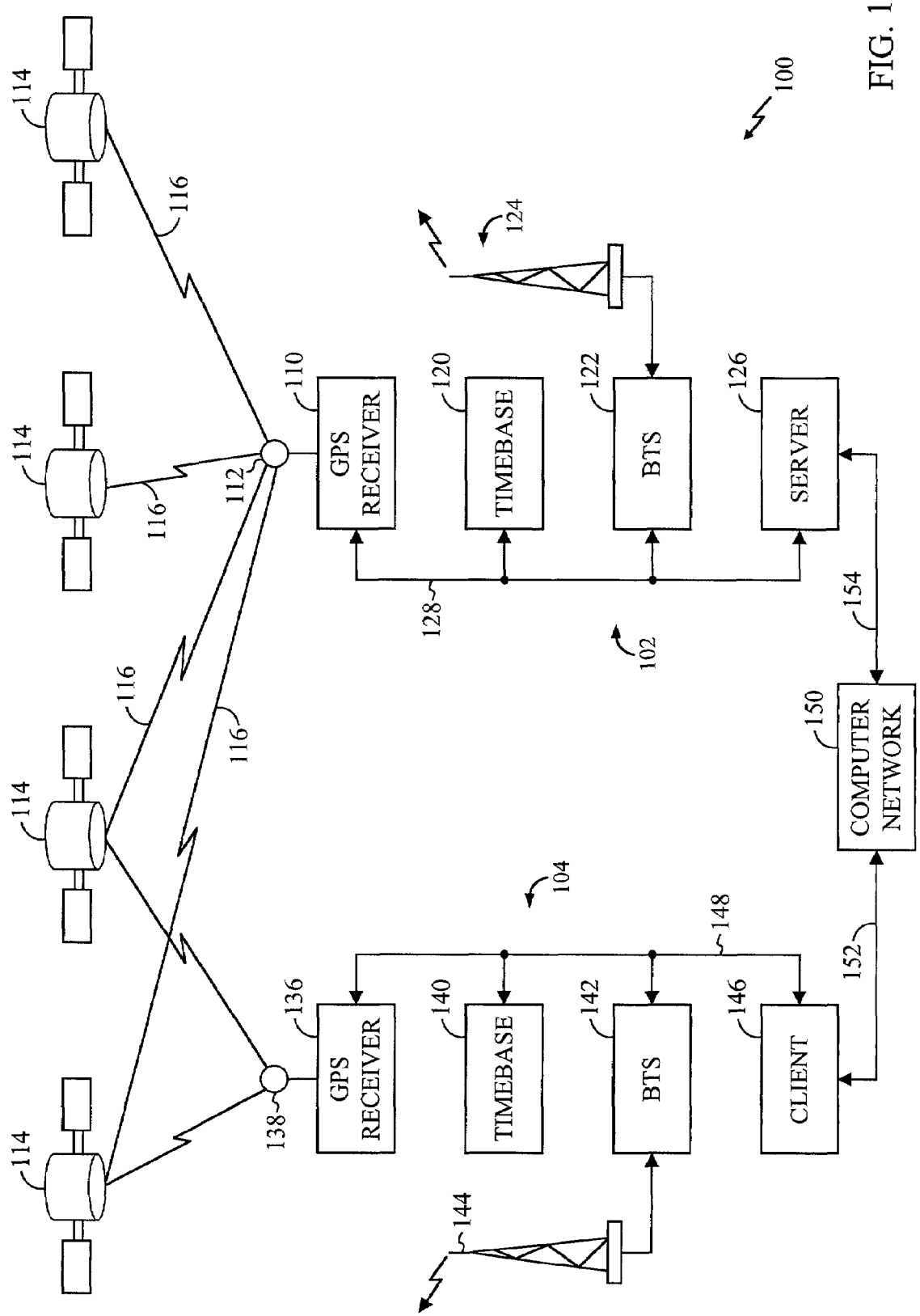
FIG. 1 is a functional block diagram of one implementation of the present invention.

Many communication systems desire an accurate timebase for optimum operation. Indeed, an accurate timebase is essential for satisfactory operation of some communication systems, such as the CDMA wireless communications system known in the art. In the conventional CDMA system, each base station transceiver system (BTS) is in a fixed location and includes a high quality GPS receiver from which a highly accurate time may be derived. The range of such a BTS is typically several miles, which permits communication with any mobile unit within its range.

CDMA specifications require each BTS to by synchronized in time within 10.0 microseconds of each other. Ideally, the CDMA system will have BTS synchronization within 3.0 microseconds. To provide the necessary accuracy, early base stations used a high quality frequency standard, such as a Cesium beam standard to maintain an accurate time. With the introduction of the GPS, expensive Cesium beam standards can be replaced with conventional crystal oscillators or temperature controlled crystal oscillators to provide time signals for the BTS. The BTS timebase is synchronized with GPS signals to provide an accuracy of ±50 nanoseconds (nsec.) to ±500 nsec. Modern wireless communication systems rely more heavily on GPS to provide timing signals and thereby replace expensive standalone time references. The ability to synchronize the BTS timebase with the GPS depends on the quality of signals received from the plurality of satellites in the GPS. For this reason, a BTS is typically located in an area where the GPS antenna may be free of obstructions and thus provide the necessary communication and synchronization capability with a plurality of the GPS satellites.

In certain implementations, it may be impossible to position a GPS receiver so as to communicate with and synchronize with the required plurality of GPS satellites. For example, an enterprise-wide wireless system may be well suited to a number of short range BTSs to avoid overloading a single large BTS. A business may occupy a single large building or a group of buildings in a campus-like arrangement. A single large BTS may have insufficient capacity to handle the call volume for all employees. In this implementation, it is desirable to replace a single large BTS with a plurality of "micro-BTS" or "pico-BTS" installations. The range of a pico-BTS is generally very limited and may require a hand-off from one pico-BTS to another as the employee moves from one building on a campus to another or even from one location in a single building to another location within the same building.

As can be appreciated by those skilled in the art, it is desirable to implement a pico-BTS installation with a small and inexpensive unit that may typically be mounted indoors. Although an indoor BTS may solve the communication needs of an enterprise-wide communication system, such implementations are not generally compatible with the high quality GPS receiver typically used in a BTS installation. That is, the antenna of an indoor GPS receiver will generally also be indoors and thus not able to effectively communicate with a plurality of GPS satellites. This limits the ability of the indoor GPS receiver to synchronize and communicate effectively with the required number of GPS satellites so as to establish an accurate timebase. The present invention is designed to overcome these problems and provide an accurate timebase.

An exemplary embodiment of the present invention is illustrated in FIG. 1 where an inventive system 100 which comprises a conventional base station 102 and a limited range base station 104, such as may be used in a building or portion of a building. The conventional base station 102 comprises a high quality GPS receiver 110 and GPS antenna 112. As previously discussed, the GPS receiver 110 is capable of communicating with a sufficient number of satellites 114 to establish an accurate location and timebased on the communication signals from the satellites. In the illustration shown in FIG. 1, the GPS receiver 110 establishes a plurality of satellite links 116 with corresponding ones of the satellites 114. The operation of the GPS receiver 110 to accurately determine the location of the GPS receiver and the correct time is known in the art and need not be described in greater detail herein.

The time signals derived from the GPS receiver are used to synchronize a timebase 120. The timebase 120 provides the accurate timing signals required for satisfactory operation of the base station 102. Specifically, the timebase 120 may typically be a crystal controlled oscillator and may further have temperature control for additional stability. The GPS receiver 110 receives one pulse per second time signals from the GPS and synchronizes those time signals with a one pulse per second signal derived from the timebase 120. In an exemplary embodiment, the timebase 120 is a slave oscillator that synchronizes and locks to the timing signals provided by the GPS. As noted above, GPS derived signals have an accuracy of ±50 nsec.-±500 nsec. This provides sufficient timing accuracy for satisfactory operation of a CDMA wireless system.

The base station 102 comprises a base station transceiver system (BTS) 122 that is coupled to an antenna 124. The BTS 122 communicates with a plurality of mobile units (not shown) in a conventional fashion using the timebase 120 to provide the necessary timing signals.

The base station 102 also operates in conjunction with a server 126 to derive and provide accurate time signals to the limited range base station 104. It should be noted that the server 126 need not be an integral part of the base station 102, but is communicatively coupled to the base station 102 to receive the timing signals therefrom. For example, the server may be remotely located from the base station 102 and may be coupled to the base station using a wireless communication link, hard wired link, or computer network, such as the Internet. The present invention is not limited by the specific form of communication between the server 126 and the base station 102. As will be described in greater detail below, the server 126 will derive an accurate time adjustment to allow synchronization of the limited range base station 104 with the base station 102.

The various components of the base station 102 are coupled together via a bus system 128. Those skilled in the art will recognize that the bus system 128 is illustrated to show communication links between the various components of the base station 102 and the server 126. The bus system 128 may include radio frequency (RF) links as well as a digital data bus, address bus, control bus, power bus, and the like. For the sake of simplicity, these various communication links and buses are illustrated as the bus system 128.

The limited range base station 104 also includes a GPS receiver 136 and GPS antenna 138. Unlike the GPS receiver 110, the GPS receiver 136 is typically a low cost device that may be located indoors where the GPS antenna 138 may be incapable of detecting signals from a sufficient number of the plurality of satellites 114. Thus, the GPS receiver 136 is typically unable to provide the necessary synchronization to derive accurate time signals from the satellites 114.

The limited range base station 104 also includes a timebase 140 to provide timing signals for communication purposes. In an exemplary embodiment, the timebase 140 may use a crystal oscillator or temperature controlled crystal oscillator as the reference source and generates timing signals, such as the one pulse per second timing signal generated by GPS. The timebase 140 provides reasonably accurate timing signals, in a standalone mode. However, satisfactory operation of the system 100 requires close synchronization between the timebase 120 and the timebase 140. While the timebase 120 derives highly accurate time signals via the GPS receiver 110, the GPS receiver 136 does not have the ability to provide accurate timing signals to the timebase 140. The system 100 provides a technique for synchronizing the timebase 120 and the timebase 140, as will be described below.

The limited range base station 104 also includes a BTS 142 and antenna 144. As previously discussed, the BTS 142 may be a pico-BTS designed for limited range operation to provide coverage for a portion of an office building or a portion of an office complex. However, the present invention is directed to techniques for synchronizing the timebase 120 and the timebase 140. Thus, the specific implementation of the BTS 142 is not critical to proper implementation of the present invention.

The limited range base station 104 also includes a client computer system 146. It should be noted that the client 146 need not be an integral part of the limited range base station 104 but is communicatively coupled to the limited range base station.

The various components of the limited range base station are coupled together by a bus system 148. Those skilled in the art will recognize that the bus system 148 is illustrated to show communication links between the various components of the base station 102 and the server 126. The bus system 148 may include RF links as well as a digital data bus, address bus, control bus, power bus, and the like. For the sake of simplicity, these various communication links and buses are illustrated as the bus system 148.

For the sake of convenience, the system 100 illustrated in the exemplary embodiment of FIG. 1 is shown in a client-server architecture. In this implementation, the client 146 passes data along to the server 126 via a computer network 150. The server 126 processes the data and returns timebase synchronization data via the computer network 150. The computer network 150 may be any form of computer network, including, but not limited to, a local area network (LAN), wide area network (WAN), private network, the Internet, or the like.

The client 146 is coupled to the computer network 150 via a communication link 152 while the server 126 is coupled to the computer network via a communication link 154. The communication links 152 and 154 may be any conventional form of communication including, but not limited to an RF link, optical link, high speed data connection, Internet connection, or the like. Because the data processing to derive timebase synchronization data is not time critical, data can be passed from the client 146 to the server 126 for non-real time processing. In an exemplary embodiment, the server 126 returns a time correction factor that allows the client 146 to synchronize the timebase 140.

The use of a client-server system to accurately determine the location of the GPS receiver 136 is known in the art. For example, U.S. Pat. No. 6,131,067 (the '067 patent) describes a technique by which a GPS receiver detects only limited data from one or more of the satellites 114. The limited data is referred to in the '067 patent as a "snapshot" and the limited capability GPS receiver is referred to as a "snapshot GPS receiver." In the '067 patent, the limited data detected by the snapshot GPS receiver is transmitted to the server for further analysis. That is, the GPS snapshot receiver gathers some position data and transmits it to the server for further processing. The server, which derives full GPS data from its associated GPS receiver, is capable of analyzing the limited position data from the snapshot GPS receiver.

It should be noted that the server disclosed in the '067 patent need not be in the same location as the snapshot GPS receiver. Indeed, the server may be located at a great distance from the snapshot GPS receiver. The server is provided with limited data as to the approximate geographic location of the snapshot GPS receiver. For example, the server may receive limited position data from the snapshot GPS receiver along with information that the snapshot GPS receiver is in the southern California area. The server processes its own full GPS data and the limited position data provided by the snapshot GPS receiver to thereby determine the precise location of the snapshot GPS receiver. The accurate position information is relayed back to the client via a computer network. Thus, the server in the '067 patent performs a non-real time calculation based on the limited position data provided by the snapshot GPS receiver to thereby derive accurate position information regarding the precise location of the snapshot GPS receiver.

The system 100 operates in a similar fashion to accurately determine the time. The GPS receiver 136 functions in a manner similar to the snapshot GPS receiver in that it provides only partial or limited position data based on communication with a limited number of satellites or with low level signals from satellites such that complete synchronization is not possible.

Thus, the GPS receiver 136 provides only limited position data and is incapable of providing accurate time information for the timebase 140. However, the limited position data from the GPS receiver 136 is transmitted by the client 146 to the server 126 via the computer network 150 in a manner similar to that described in the '067 patent. In addition to the limited position data provided by the GPS receiver 136, the timebase 140 provides the current time at which the limited position data was captured. For example, the GPS receiver 136 may capture limited position data at a local time, as indicated by the timebase 140, of 9:01.00 a.m. PST. The limited position data and capture time is transmitted from the client 146 to the server 126 via the computer network 150.

The server 126 processes the limited position data in a known manner, such as that described in the '067 patent, and may provide accurate position information regarding the position of the GPS receiver 136.

Briefly, the server 126 calculates where the GPS receiver 136 must have been located at the time the limited position data was captured for the GPS receiver 136 to have captured the particular set of limited position data. In addition to calculating position data, the server 126 is also capable of determining the precise time at which the limited position data was captured by the GPS receiver 136. That is, the limited position data provided by the GPS receiver 136 is analyzed to determine the precise time at which the data was captured by the GPS receiver 136. Just as the limited position data could only have been captured if the GPS receiver 136 were at a precise location, the limited position data could only have been captured at that precise location at a particular point in time. The server 126 calculated the precise time at which the data had to have been captured by the GPS receiver 136. In the example above where the timebase 140 indicated that the position data was captured at precisely 9:00.00 a.m. PST, the server 126 may determine that the data was actually captured at a different time, such as, by way of example, 9:00.01 a.m. PST. Thus, in this example, the timebase 140 is 0.01 seconds slow.

The time synchronization data is transmitted from the server 126 to the client 146 via the computer network 150. The client 146 updates the timebase 140 with the correction factor provided by the server 126. Thus, the timebase 140 is synchronized with the timebase 120. It should be noted that the timebase 120 need not provide timing signals to the timebase 140 for proper synchronization. Rather, the server 126 accurately calculates the time at which the limited location data was captured by the GPS receiver 136. The server 126 transmits the time data to the client 146 which corrects any timing error in the timebase 140. Thus, the timebase 120 and timebase 140 are inherently synchronized to each other since timing signals were both derived via the GPS receiver 110.

Alternatively, the server 126 and client 146 may communicate with each other via wireless communication links provided by the BTS 122 and BTS 142, respectively. That is, the BTS 142 may transmit the limited position data and capture time to the server 126 via a wireless communication link established with the BTS 122. Similarly, accurate time data may be provided from the server 126 to the client 146 via a wireless communication link between the BTS 122 and the BTS 142.

The frequency with which the timebase 140 is re-synchronized depends on the inherent accuracy of the timebase 140. For example, the timebase 140 may be a crystal controlled oscillator, but in an environment where it is subject to temperature fluctuations and thus thermal drift. In such an installation, it may be desirable to resynchronize the timebase 140 several times per day. In contrast, the timebase 140 may be a crystal controlled oscillator with a temperature controlled oven for the crystal. In this installation, the timebase 140 may be relatively accurate and thus requires less frequent re-synchronization.

The exemplary embodiment of FIG. 1 illustrates the time synchronization techniques of the present invention for use with a wireless communication device, such as a cellular phone system. Although the example presented above related to a CDMA system, those skilled in the art will recognize that the timebased synchronization of the present invention may be readily used with other forms of wireless communication. Further, the timebase synchronization techniques of the present invention may be used in any electronic system that requires an accurate timebase.

Figure 2:
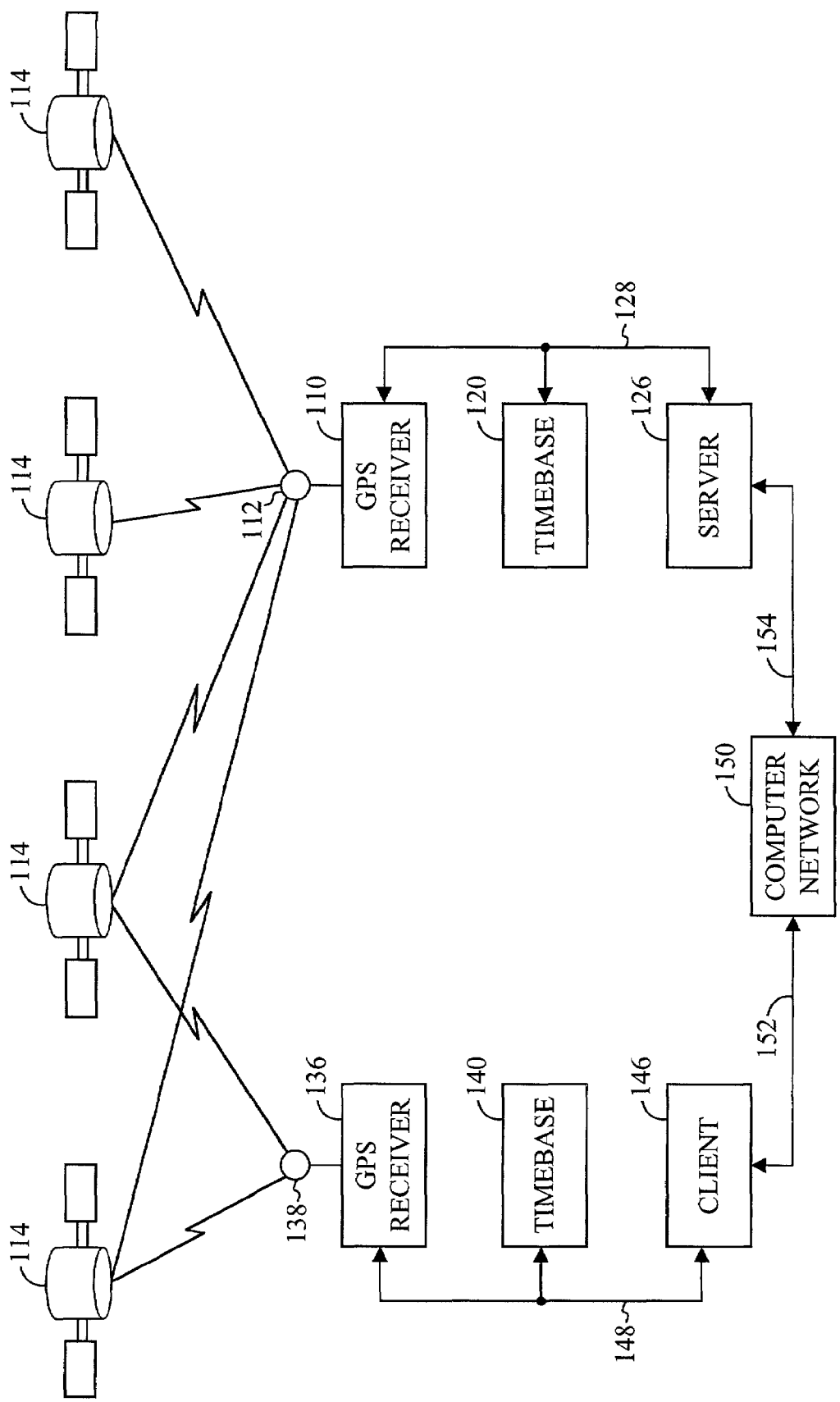
FIG. 2 is an alternative embodiment of the present invention.

An alternative embodiment, which does not include a wireless communication system, is illustrated in FIG. 2. In this embodiment, the GPS receiver 136 receives limited position data from the satellites 114. However, as discussed above, the data captured by the GPS receiver 136 is insufficient to independently establish an accurate time for the timebase 140. Accordingly, the client 146 transmits the limited position data and time to the server 126 via the computer network 150. The server 126 processes the limited position data from the GPS receiver 136 and the time from the timebase 140 in conjunction with complete location information from the GPS receiver 110 and an accurate time from the timebase 120. The server 126 processes this data to produce an accurate time at which the GPS receiver 136 actually captured the fragmentary data. It should be noted that this may or may not correspond to the time in the timebase 140. The server 126 may transmit the accurate time (i.e., the correct time) or simply transmit a correction factor by which the timebase 140 may correct itself. As noted above, in one embodiment the server 126 transmits the timing data to the client 146 via the computer network 150. In an alternative embodiment, the client 146 and server 126 may each have associated wireless devices, such as cellular telephones, or the like. Because the calculations performed by the server are not done in real time, any convenient form of communication between the client 146 and server 126 is satisfactory. If the client 146 and server 126 are coupled by a wireless device, the limited location data and capture time are transmitted from the client 146 to the server 126 via the wireless communication link while the accurate time data transmitted from the server 126 to the client 146 may be transmitted via the same wireless communication link. However, the server 126 may establish a second wireless communication link at a later time when the calculations are complete. Those skilled in the art will also recognize that a combination of wireless communication link and link via the computer network 150 are also possible. The present invention is not limited by the specific form of communication link between the client 146 and the server 126.

The specific data format and structure used to transmit fragmentary captured GPS data and time of capture from the client 146 to the server 126 is not critical to satisfactory operation of the system 100. That is, any number of different data forms and structures may be used to transmit the data. In an exemplary embodiment, the system 100 may utilized conventional industry standards for transmission of such data. One example standard is TIA/EIA/IS-801, which is an interim standard for "Position Determination Service Standard For Dual Mode Spread Spectrum Systems." IS-801 provides standard data structures for communication of GPS-related data from a mobile station to a base station. In applying IS-801 to the present invention, the client 146 essentially functions as the mobile station for purposes of data transmission of fragmentary GPS data while the server 126 functions as the base station in responding to the transmitted fragmentary GPS data. This standard is well known in the art and need not be described in greater detail herein. Alternatively, other custom data structures may be used to transmit data between the client 146 and the server 126.

Figure 3:
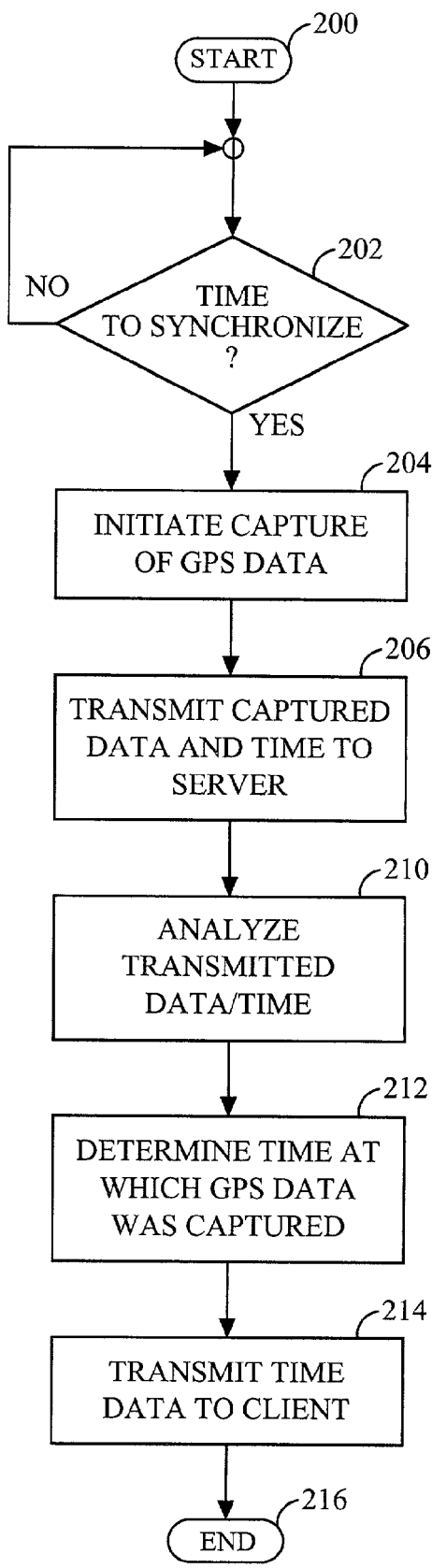
FIG. 3 is a flowchart illustrating the operation of the present invention.

The operation of the system 100 is illustrated in the flowchart of FIG. 3 where, at a start 200, the client is coupled to a GPS receiver (i.e., the GPS receiver 136), which is incapable of determining accurate time signals. As noted above, the data received by the GPS receiver 136 may be considered limited, incomplete, partial, or fragmentary. These terms are simply intended to indicate that the GPS receiver 136 has insufficient data to accurately determine the time for the timebase 140. This may result from the inability of the GPS receiver 136 to establish a communication link with sufficient number of the satellites 114, or the inability of the GPS receiver 136 to properly synchronize with one or more of the satellites to permit the detection of the signal and phase that are required for proper determination of location and time. The present invention is intended to permit the synchronization of the timebase 140 under any condition in which the GPS receiver 136 is incapable of providing the necessary data with which to set the timebase 140.

In decision 202, the system 100 determines whether it is time to synchronize the timebase 140 with the timebase 120. As noted above, the decision to synchronize may be made on the basis of the inherent accuracy of the timebase 140. For example, high thermal drift may require more frequent synchronization than a timebase having low thermal drift. Alternatively, the system 100 may periodically synchronize the timebase 140 with the timebase 120 regardless of the inherent accuracy of the timebase 140. For example, the timebase 140 may synchronize with the timebase 120 every hour. Those skilled in the art will recognize that the specific times at which synchronization occurs are not critical to satisfactory operation of the system 100. Accordingly, the present invention is not limited by any specific time at which synchronization occurs. If it is not time to synchronize, the result of decision 202 is NO. In that event, the system 100 returns to decision 202 until it is time to synchronize.

When it is time to synchronize the timebase 140 with the timebase 120, the result of decision 202 is YES and, in step 204, the system initiates a capture of GPS data using the GPS receiver 136. As noted above, the data received by the GPS receiver 136 is insufficient to provide proper timing data for the timebase 140. Instead, in step 206, the client 146 transmits the captured GPS data and time of capture to the server 126 via the computer network 150.

In step 210, the server 126 analyzes the transmitted data and time with respect to its own GPS data generated by the GPS receiver 112 and time available from the timebase 120. As noted above, the timebase 120 is highly accurate since it is based on complete and accurate GPS data from the satellites 114. Those skilled in the art will appreciate that the analysis in step 210 need not be performed in real time. That is, the server 126 can analyze the transmitted data and time to determine the actual time at which the fragmentary or incomplete GPS data was captured by the GPS receiver 136. In step 212, the server 100 determines the time at which the GPS data was captured by the GPS receiver 136.

In step 214, the server 126 transmits time data to the client 146 via the computer network 150. The time data may be in the form of the accurate time of day at which the GPS receiver 136 captured the data. In this embodiment, the client 146 compares the time at which the GPS receiver 136 indicated that the GPS data was captured in comparison with the actual time at which the GPS data was captured as indicated by the server 126. The difference between these two times is the error in the timebase 140. Alternatively, the server 126 may perform such calculation and transmit an offset or correction factor to synchronize the timebase 140. That is, the client 146 transmits the fragmentary or incomplete GPS data and the time, as indicated by the timebase 140, at which the GPS data was captured. The server 126 analyzes the GPS data and time from the GPS receiver 110 and the timebase 120 to accurately determine the time at which the GPS data was captured by the GPS receiver 136. Thus, the server 126 has the two pieces of time information (i.e., the time of capture indicated by the timebase 140 and the time of capture calculated by the server 126) and may readily determine an error correction factor or offset. In this exemplary embodiment, the server 126 transmits the error correction factor or offset to the client 146 via the computer network. The process ends at 216 with the timebase 140 being accurately synchronized to the timebase 120.

Thus, the present invention allows the synchronization of timebases even when a remote timebase has limited GPS accessibility. In an exemplary embodiment, the GPS receiver 110 is capable of providing time to the timebase 120 with an accuracy of ±50 nsec.-±500 nsec. The server 126 can transmit data (i.e., the error correction factor or accurate time of day) to the client 146 to provide virtually any desired level of accuracy up to the resolution of the timebase 120 itself. That is, the server 126 can transmit data indicating the correct time of day to within a resolution of ±50 nsec.-±500 nsec. Examples have been presented herein that utilize the synchronized timebases for wireless communication (e.g., a wireless telephone system) and for applications in which it is desirable to synchronize remote timebases. The system 100 has been described for use with a single client 146. However, those skilled in the art will appreciate that the principles of the present invention may be extended to multiple clients. Each client 126 in turn communicates with the server 146 and synchronizes its individual timebase to the timebase 120. In this manner, multiple clients 146, are synchronized not only with the server 126, but with each other.

It is to be understood that even though various embodiments and advantages of the present invention have been set forth in the foregoing description, the above disclosure is illustrative only, and changes may be made in detail, yet remain within the broad principals of the invention. Therefore, the present invention is to be limited only by the appended claims.

What is claimed is:

1. A system for time-base synchronization, comprising:
   a first base station transceiver system (BTS) having a transmitter and receiver, the transmitter being used to transmit partial location data and a capture time at which the partial location data was received;
   a timing circuit associated with the first BTS to maintain time;
   a second BTS adapted to communicate with the first BTS to receive the partial location data and the capture time from the first BTS;
   a processor communicatively coupled to the second BTS and adapted to receive the partial location data and time therefrom; and
   a GPS receiver associated with the processor to provide complete location data to the processor, the processor being adapted to process the complete location data and partial location data to determine therefrom an accurate time at which the partial location data was received, the second BTS being adapted to provide to the first BTS time data related to the accurate time at which the partial location data was received by the first BTS, and wherein the first BTS is adapted to synchronize the timing circuit based, at least in part, on the time data received from the second BTS.

2. The system of claim 1 wherein the time data transmitted to the first BTS is the accurate time at which the partial location data was received by the first BTS.

3. The system of claim 1 wherein the time data transmitted to the first BTS comprises a time error indicating a difference between the capture time and the accurate time at which the partial location data was received by the first BTS.

4. The system of claim 1, further comprising a computer network operatively coupling the first BTS and the second BTS.

5. The system of claim 1 further comprising a wireless connection operatively coupling the first BTS and the second BTS.

6. The system of claim 1 wherein the processor is a portion of the second BTS.

7. A system for server-assisted time-base synchronization, comprising:
   a first timing circuit to maintain time;
   a first global positioning system (GPS) receiver to capture partial location data;
   a client processor to provide the partial location data and a capture time at which the partial location data was captured;
   a server processor communicatively coupled to the client processor and adapted to provide the partial location data and capture time therefrom; and
   a second GPS receiver associated with the server processor to provide complete location data to the server processor, the server processor being adapted to process the complete location data and partial location data to determine therefrom an accurate time at which the partial location data was captured by the first GPS receiver, the server processor being adapted to provide to the client processor time data related to the accurate time at which the partial location data was captured by the first GPS receiver and wherein the time maintained by first timing circuit is adjusted based, at least in part, on the time data received by the client processor.

8. The system of claim 7 wherein the time data transmitted from the server processor to the client processor is the accurate time at which the partial location data was captured.

9. The system of claim 7 wherein the time data transmitted from the server processor to the client processor comprises a time error indicating a difference between the capture time and the accurate time at which the partial location data was captured.

10. The system of claim 7, further comprising a computer network coupling the client processor and the server processor to enable communication between the client processor and the server processor.

11. The system of claim 10 wherein the computer network comprises the Internet.

12. The system of claim 7, further comprising first and second transceivers associated with the client and server processors, respectively, wherein communication between the client processor and the server processor uses a wireless communication link between the first and second transceivers.

13. The system of claim 7 wherein the second GPS receiver is co-located with the server processor.

14. A method for server-assisted time-base synchronization, comprising:

maintaining time with a timing circuit;

capturing partial location data using a first global positioning system (GPS) receiver;

providing the partial location data and a capture time at which the partial location data was captured to a server;

capturing complete location data using a second global positioning system (GPS) receiver associated with the server;

with the server, processing the complete location data and partial location data to determine therefrom an accurate time at which the partial location data was captured by the first GPS receiver;

providing time data related the accurate time at which the partial location data was captured by the first GPS receiver to the timing circuit; and adjusting the time maintained by timing circuit based, at least in part, on the time data.

15. The method of claim 14 wherein the time data provided to the timing circuit is the accurate time at which the partial location data was captured.

16. The method of claim 14 wherein the time data provided to the timing circuit comprises a time error indicating a difference between the capture time and the accurate time at which the partial location data was captured.

17. The method of claim 14 wherein providing the providing time data comprises transmitting the time data via a computer network.

18. The method of claim 17 wherein the computer network comprises the Internet.

19. The method of claim 14 wherein providing the partial location data and a capture time comprises transmitting the partial location data and a capture time via a computer network.

20. The method of claim 19 wherein the computer network comprises the Internet.

21. The method of claim 14 for use with first and second transceivers associated with the timing circuit and server, respectively, wherein communication between the timing circuit and the server uses a wireless communication link between the first and second transceivers.

22. The method of claim 14 wherein the second GPS receiver is co-located with the server.

23. A method for server-assisted time-base synchronization, comprising:

maintaining time with a timing circuit;

capturing partial location data using a first global positioning system (GPS) receiver;

providing the partial location data and a capture time at which the partial location data was captured to a server;

with the server, analyzing the partial location data to determine therefrom an accurate time at which the partial location data was captured; providing time data related the accurate time at which the partial location data was captured to the timing circuit; and adjusting the time maintained by timing circuit based, at least in part, on the time data.

24. The method of claim 23 wherein analyzing the partial location data is performed with respect to complete location data provided by a second GPS receiver associated with the server.

* * * * *